United States Patent
Kataoka et al.

(10) Patent No.: US 10,324,963 B2
(45) Date of Patent: Jun. 18, 2019

(54) INDEX CREATING DEVICE, INDEX CREATING METHOD, SEARCH DEVICE, SEARCH METHOD, AND COMPUTER-READABLE RECORDING MEDIUM

(71) Applicant: FUJITSU LIMITED, Kawasaki-shi, Kanagawa (JP)

(72) Inventors: Masahiro Kataoka, Kamakura (JP); Takahiro Murata, Yokohama (JP); Takafumi Ohta, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 343 days.

(21) Appl. No.: 15/287,257

(22) Filed: Oct. 6, 2016

(65) Prior Publication Data

US 2017/0103123 A1    Apr. 13, 2017

(30) Foreign Application Priority Data

Oct. 9, 2015 (JP) ................... 2015-201547

(51) Int. Cl.
*G06F 16/31* (2019.01)
(52) U.S. Cl.
CPC ................... *G06F 16/325* (2019.01)
(58) Field of Classification Search
CPC ............ G06F 17/30619; G06F 17/30628
See application file for complete search history.

(56) References Cited

U.S. PATENT DOCUMENTS

| 5,748,953 | A | 5/1998 | Mizutani et al. |
| 10,007,615 | B1 * | 6/2018 | Gazit ................. G06F 12/0888 |
| 2012/0254190 | A1 | 10/2012 | Kataoka et al. |
| 2014/0214854 | A1 | 7/2014 | Kataoka et al. |

FOREIGN PATENT DOCUMENTS

| JP | 63-271525 | 11/1988 |
| JP | 5-174064 | 7/1993 |
| JP | 2012-216088 | 11/2012 |

* cited by examiner

*Primary Examiner* — William Spieler
(74) *Attorney, Agent, or Firm* — Xsensus LLP

(57) ABSTRACT

A non-transitory computer-readable recording medium stores an index generating program that causes a computer to execute a process including: generating presence information of a plurality of pieces of text data, the presence information including whether each of a plurality of elements, included at least one of the plurality of pieces of text data, is present for each of the plurality of pieces of text data, the presence information including a first axe for the plurality of elements and a second axe for the plurality of pieces of text data; detecting collision data for hashed index information when generating the hashed index information, the collision data corresponding to data elements that are independent in the presence information; and setting additional values to each of a plurality of specific collision data, respectively, for one of the plurality of hashed axes.

11 Claims, 13 Drawing Sheets

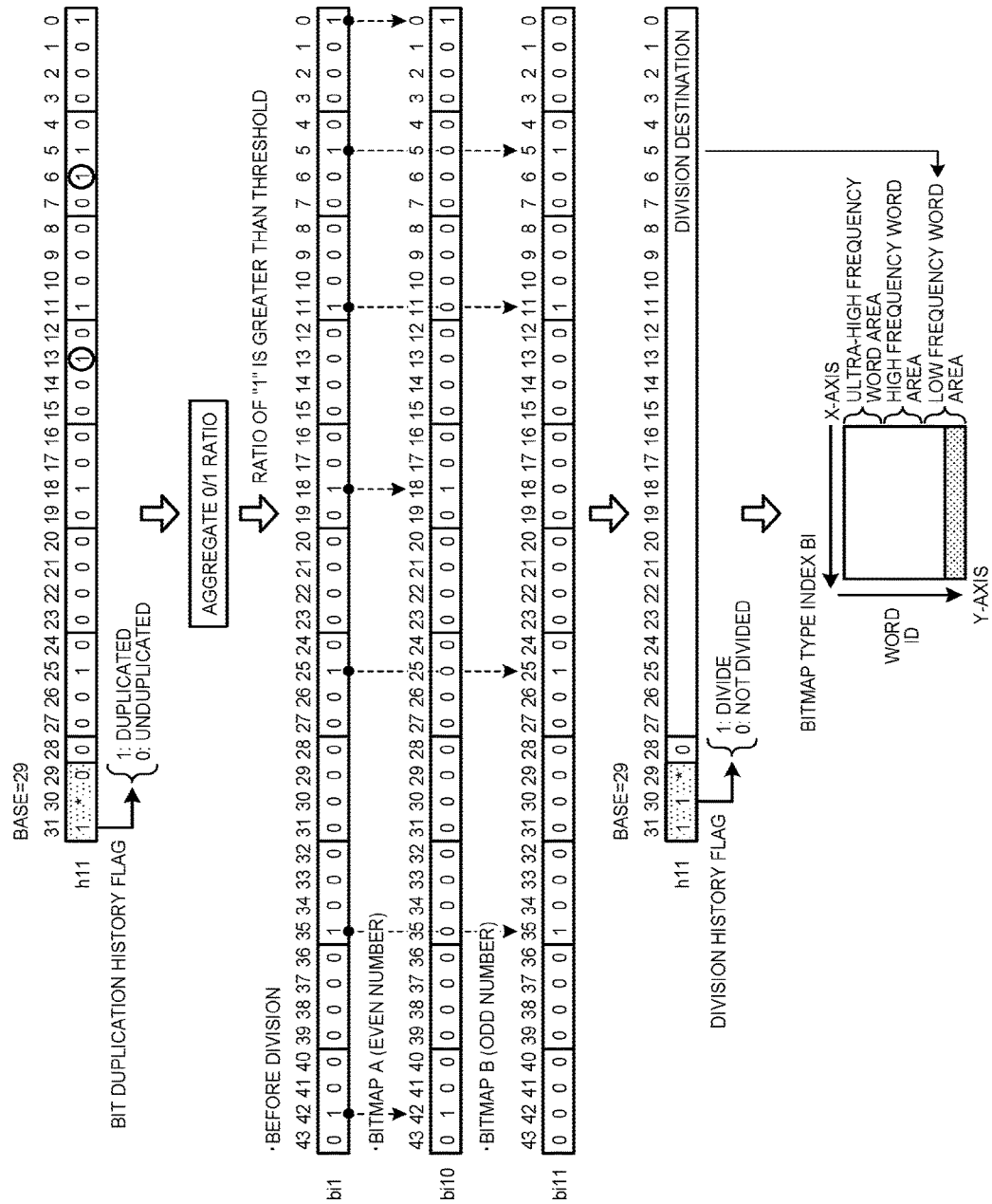

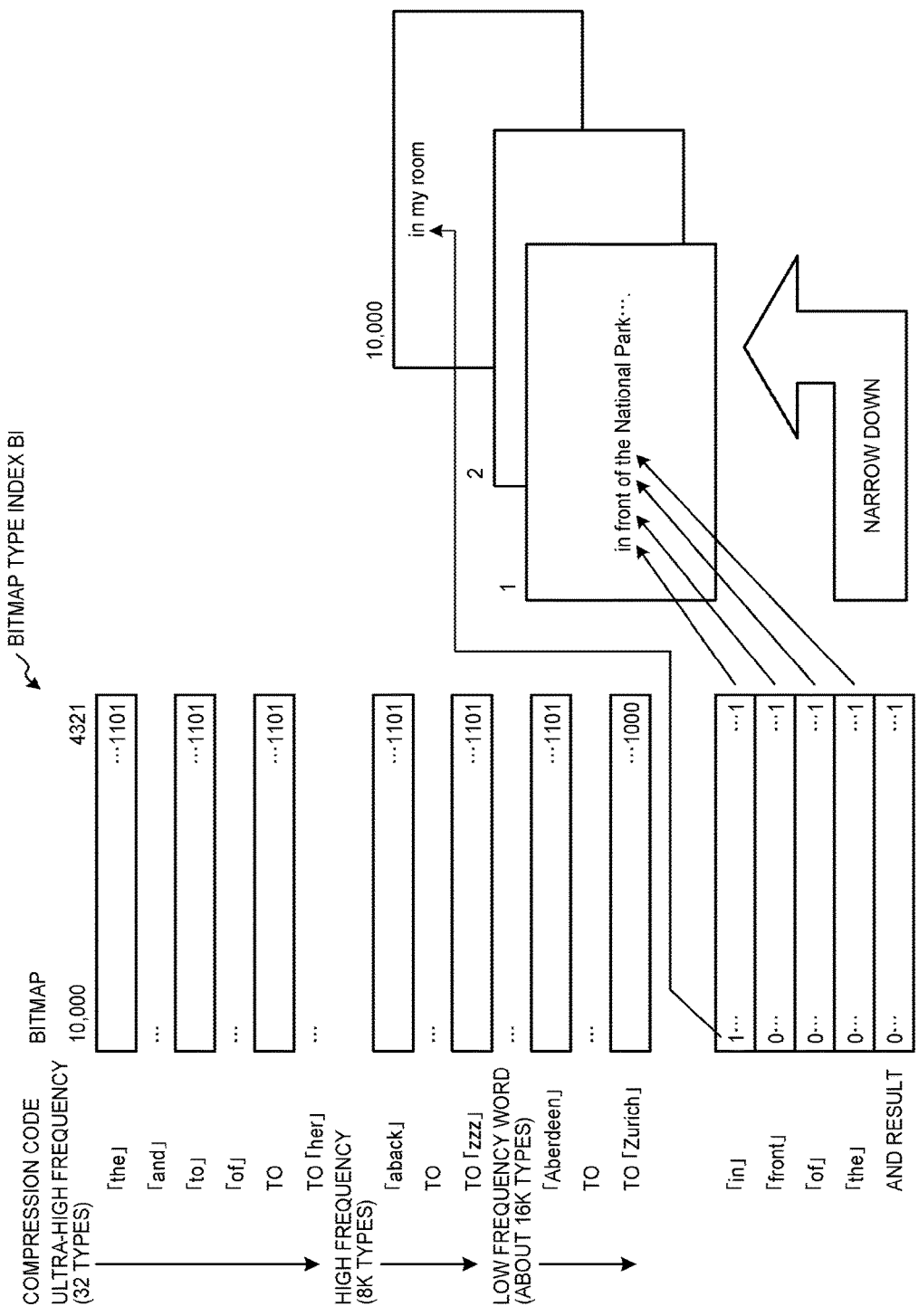

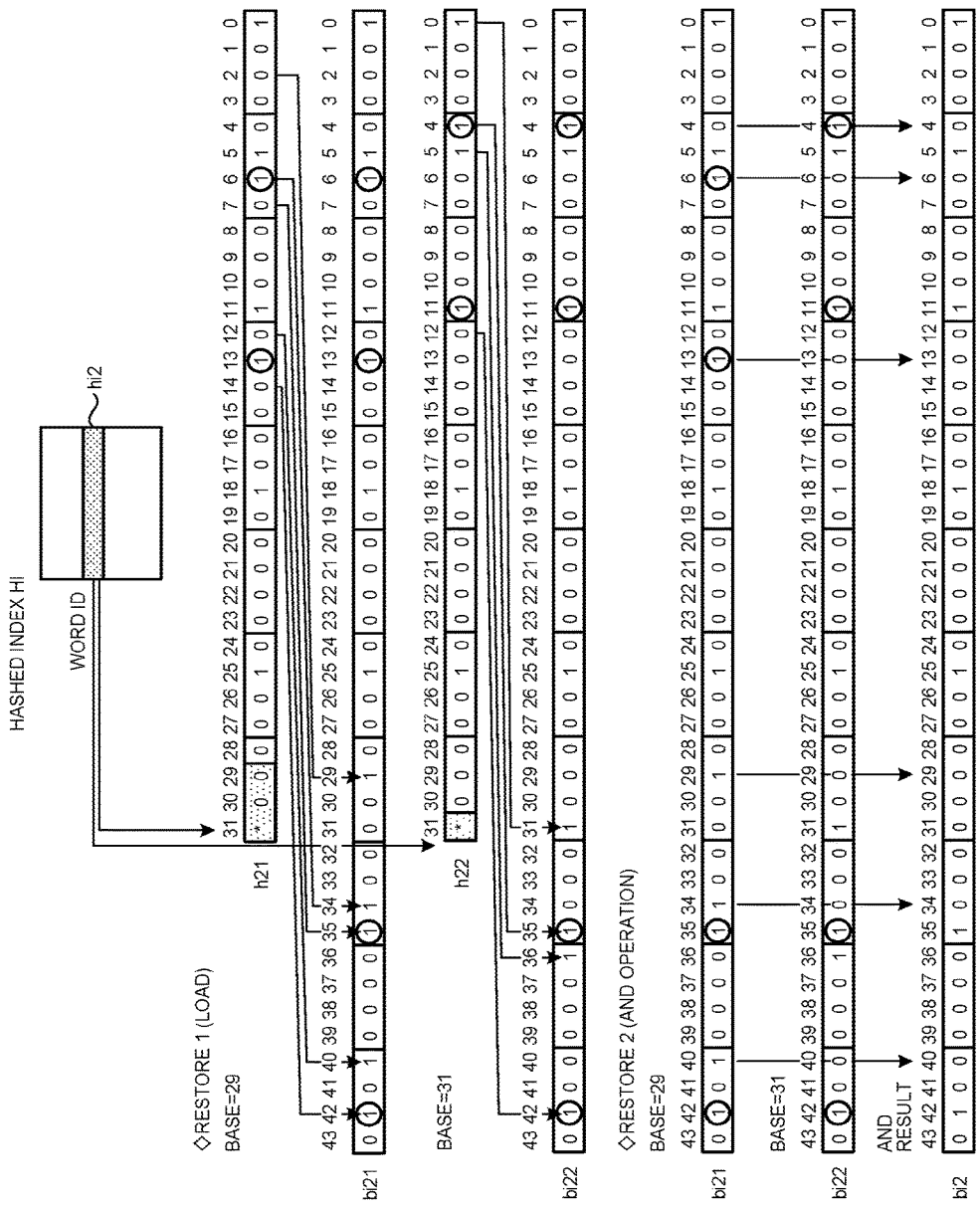

FIG.4B

- BITMAP A (EVEN NUMBER) AND RESULT

| | 43 | 42 | 41 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| bi30 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 1 |

- BITMAP B (ODD NUMBER) AND RESULT

| | 43 | 42 | 41 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| bi31 | 0 | 0 | 0 | 0 | 0 | 0 | 0 | 1 | 0 | 1 | 0 | 0 | 0 | 0 | 0 | 0 | 1 | 0 | 0 | 1 | 0 | 0 | 0 | 0 | 0 | 1 | 0 | 0 | 0 | 0 | 0 | 0 | 1 | 0 | 1 | 0 | 0 | 0 | 1 | 0 | 0 | 0 | 0 | 0 |

- MERGE (OR) RESULT

| | 43 | 42 | 41 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| bi3 | 0 | 1 | 0 | 0 | 0 | 0 | 0 | 1 | 0 | 1 | 0 | 0 | 0 | 0 | 0 | 0 | 1 | 0 | 0 | 1 | 0 | 0 | 0 | 0 | 1 | 1 | 0 | 0 | 0 | 0 | 0 | 0 | 1 | 0 | 1 | 0 | 0 | 0 | 1 | 0 | 0 | 0 | 0 | 1 |

INDEX CREATING DEVICE, INDEX CREATING METHOD, SEARCH DEVICE, SEARCH METHOD, AND COMPUTER-READABLE RECORDING MEDIUM

CROSS-REFERENCE TO RELATED APPLICATION

This application is based upon and claims the benefit of priority of the prior Japanese Patent Application No. 2015-201547, filed on Oct. 9, 2015, the entire contents of which are incorporated herein by reference.

FIELD

The embodiments discussed herein are related to a computer-readable recording medium or the like.

BACKGROUND

In order to speed up searches of text data, a bitmap type index obtained by indexing the presence or absence of each character included in text data and each file is known (for example, see Patent Documents 1 to 3).

If a bitmap type index is generated for Japanese text data, because great many kinds of characters and words are used in the text data, the size of the index becomes large. In addition, because the density of the index becomes low, the size of the index is reduced by using hash functions.

A related technology discloses a method of applying hash functions with a plurality of bases and determining, as the result of creating hashed bitmaps, a hash function with a smallest collision (conflict). Furthermore, a related technology discloses a method of checking, by using a determined hash function and hashed bitmaps based on the determined hash function, whether the content at a lot number of a hashed bitmap assigned by an evaluation value of the determined hash function has already been set (for example, see Patent Document 1).

Patent Document 1: Japanese Patent No. 2753228
Patent Document 2: Japanese Patent No. 3263963
Patent Document 3: Japanese Laid-open Patent Publication No. 2012-216088

However, there is a problem in that, in the bitmap type index of the text data, because the line in which a bit associated with most of the files is "1" is present, if a hash function is applied, a clash may occur. For example, regarding a high frequency word, such as "the" or "on" in English, for most of the files, because a line containing the bit with "1" of the bitmap type index is present, if a hash function is applied, a collision may possibly occur.

In the related technology, no action is taken in a case of not predicting whether a collision occurs in an output value of the hash function. In contrast, in a case in which a collision can be predicted, an action is taken, such as eliminating the subject from the target for the hash function such that no collision occurs, which is inconsistent. In also the example of the related technology, selecting a hash function with a minimum collision is nothing more than a reduction in action in a case of the occurrence of a collision. When a collision actually occurs, a bitmap is unable to be correctly restored, which reduces the accuracy of the index and makes a search speed low.

SUMMARY

According to an aspect of the embodiments, a non-transitory computer-readable recording medium stores an index generating program that causes a computer to execute a process including: generating presence information of a plurality of pieces of text data, the presence information including whether each of a plurality of elements, included at least one of the plurality of pieces of text data, is present for each of the plurality of pieces of text data, the presence information including a first axis for the plurality of elements and a second axis for the plurality of pieces of text data; detecting collision data for hashed index information when generating the hashed index information, the hashed index information being generated from the presence information and including a plurality of hashed axes, the plurality of hashed axes being generated by applying a plurality of hash functions to the second axis of the presence information, the collision data corresponding to data elements that are independent in the presence information with the first axis and the second axis and duplicating in the hashed index information with the first axis and the plurality of hashed axes; and setting additional values to each of a plurality of specific collision data, respectively, for one of the plurality of hashed axes, the plurality of specific collision data being the detected collision data and satisfying a specific condition, wherein by dividing a bitmap that has not been hashed into even numbered data and odd numbered data, and by using prime numbers as a basis of the plurality of hash functions, a collision of data is avoided, wherein each hash function of the plurality of hash functions has a different prime base, wherein each hash function of the plurality of hash functions is applied for each of bitmaps associated with a corresponding word identification, and creates a plurality of hashed bitmaps.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1B is a schematic diagram (2) illustrating an example of a hashed index generating process according to the embodiment;

FIG. 3A is a schematic diagram illustrating an example of a bitmap type index according to the embodiment;

FIG. 4A is a schematic diagram (1) illustrating an example of a hashed bitmap restoration process according to the embodiment;

FIG. 4B is a schematic diagram (2) illustrating an example of a hashed bitmap restoration process according to the embodiment;

DESCRIPTION OF EMBODIMENTS

Preferred embodiments will be explained with reference to accompanying drawings. The present invention is not limited to the embodiment.

Example of Generating a Hashed Index According to the Embodiment

Figure 1A:
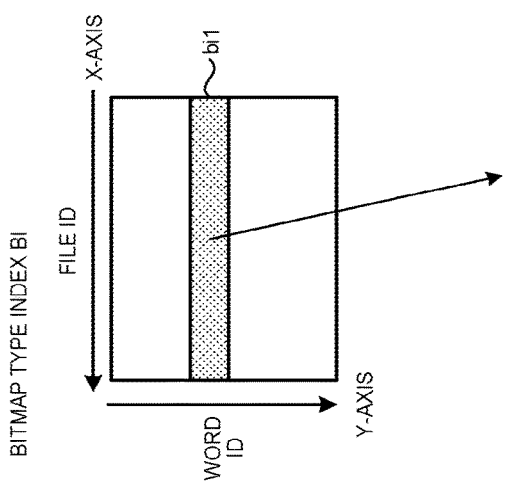
FIG. 1A is a schematic diagram (1) illustrating an example of a hashed index generating process according to an embodiment.

FIGS. 1A and 1B are schematic diagrams each illustrating an example of a hashed index generating process according to an embodiment. As illustrated in FIGS. 1A and 1B, a hashed index generating process generates a hashed index from a bitmap type index in order to reduce the size of a bitmap type index. Namely, based on a plurality of adjacent hash values (bases), the hashed index generating process generates a hashed index obtained by applying two-dimensional (the axis of words and the axis of files) hashing.

The bitmap type index mentioned here is a bitmap obtained by indexing the presence or absence of the word included in text data for each file. As illustrated in FIG. 1A, the X-axis of a bitmap type index BI represents the file identifications (IDs) and the Y-axis of the bitmap type index BI represents the word IDs. Namely, the bitmap type index BI represents the presence or absence of the word indicated by the word ID for each of the files indicated by the corresponding file IDs. As an example, a bitmap bi1 associated with a certain word ID is illustrated. If the word indicated by the certain word ID is present in a file, the binary number of "1" is set as the presence or absence of the subject word, whereas, if the subject word is not present in the file, the binary number of "0" is set as the presence or absence of the subject word. The bitmap type index BI will be described in detail later.

For example, as illustrated in FIG. 1A, the index generating device creates a plurality of hashed bitmaps to which a hash function is applied for each of the bitmaps associated with the corresponding word ID. Here, on the assumption of a 32-bit register, the index generating device hashes each of the bitmaps based on, for example, the hash values (bases) of 29 and 31. Specifically, regarding a hashed bitmap with a single base, the index generating device sets the value of each bit stored in the bitmap associated with the word ID to the position of the remainder obtained by dividing the position of each bit stored in the subject bitmap by the base. As an example, regarding a hashed bitmap h11 with the base 29, the index generating device sets the value of each bit stored in the bitmap bi1 to the position of the remainder obtained by dividing the position of each bit in the bitmap bi1 by the base of 29. The bit value "1" at the position of the $35^{th}$ bit in the bitmap bi1 is set into the $6^{th}$ bit in the hashed bitmap h11. The bit value "1" at the position of the $42^{nd}$ bit in the bitmap bi1 is set into the $13^{th}$ bit in the hashed bitmap h11. Regarding a hashed bitmap h12 with a base 31, the index generating device sets the value of each bit in the bitmap bi1 to the position of the remainder obtained by dividing the position of each bit in the bitmap bi1 by the base 31. The bit value "1" at the position of the $35^{th}$ bit in the bitmap bi1 is set into the $4^{th}$ bit in the hashed bitmap h12. The bit value "1" at the position of the $42^{nd}$ bit in the bitmap bi1 is set into the $11^{th}$ bit in the hashed bitmap h12. Namely, the index generating device sequentially sets each of the bits starting from the $0^{th}$ bit in a bitmap to the bits starting from the $0^{th}$ bit to the $(base-1)^{th}$ bit in a hashed bitmap. Then, the index generating device returns again and sets the value obtained from the OR operation performed with the value that has already been set in the hashed bitmap and that starts from the $0^{th}$ bit in the hashed bitmap.

Here, when the index generating device creates a hashed bitmap, the index generating device may sometimes detect a collision (hash noise) of the hash. For example, because a ultra-high frequency word is present in a plurality of files, the bit value at the plurality of positions in the bitmap associated with the ultra-high frequency word is set to "1". Then, if the bitmap is hashed, there may sometimes be a case in which "1" is set at the same position in a hashed bitmap in a duplicated manner. Examples of ultra-high frequency words include, in a case of 1 gram, "the" and "on". In a case of 2 grams, "in the", "on the", and "of the" are ultra-high frequency words.

Thus, the index generating device performs hash collision monitoring on hash noise and reduces the hash noise by measuring the 0/1 ratio or by dividing a bitmap. For example, as illustrated in FIG. 1B, when the index generating device performs hash collision monitoring and detects a hash collision, the index generating device sets "1" indicating duplication to a bit duplication history flag in a hashed bitmap. Here, it is assumed that the position at the $31^{st}$ bit, which is free, in the hashed bitmap to the bit duplication history flag.

If a collision continuously occurs in one of the hashed bitmaps, the index generating device aggregates the ratio of the presence/absence (1/0) by using presence information on a bitmap with the word ID associated with the hashed bitmap in which a collision occurs. Determining whether a collision continuously occurs in a hashed bitmap may be performed by using the bit duplication history flag in the hashed bitmap. Namely, if a collision occurs in a hashed bitmap, when "1" indicating duplication has already been set in the bit duplication history flag in the subject hashed bitmap, the index generating device determines that a collision has continuously occurred. This is because, it is assumed that, if a collision continuously occurs, the ratio of "1" associated with the word ID in the bitmap exceeds a predetermined threshold. An example of the threshold is 50%. However, the threshold is not limited to this and may be the minimum ratio of "1", in the bitmap, in which hash noise is supposed to be sharply increased.

If the ratio of "1" is greater than the threshold, the index generating device divides the bitmap of the word ID associated with the hashed bitmap in which collisions occur. Specifically, the index generating device extracts the bits at the even numbered position in the bitmap of the word ID associated with the hashed bitmap in which collisions occur and then newly creates a bitmap. In addition, the index generating device extracts the bits at the odd numbered position of the bitmap of the word ID associated with the hashed bitmap in which collisions occur. As an example, the bitmap that has the word ID associated with the hashed bitmap in which collisions occur and that is obtained before division is set to bi1. Then, index generating device extracts each of the bits at the even numbered position in the bitmap bi1 that is obtained before division and then newly creates a bitmap bi10. The index generating device extracts each of the bits at the odd numbered position in the bitmap bi1 that is obtained before division and then newly creates a bitmap bi11.

The index generating device stores the newly divided bitmaps bi10 and bi11 in a low frequency word area as the division destination. The index generating device sets the division destination to one of the plurality of the hashed bitmaps. Furthermore, the bitmap type index BI is formed by an ultra-high frequency word area, a high frequency word area, and a low frequency word area. The low frequency word area is formed at the lowest level portion.

Then, after having divided the bitmap, the index generating device creates, as illustrated in FIG. 1A, a plurality of hashed bitmaps with respect to each of the bitmaps at the division destination. Consequently, even if a collision occurs in data in a hashed bitmap, by dividing the bitmap that has not been hashed into even numbered data and the odd numbered data, the index generating device can avoid a collision of data.

Explanation of Hash Noise

Figure 2:
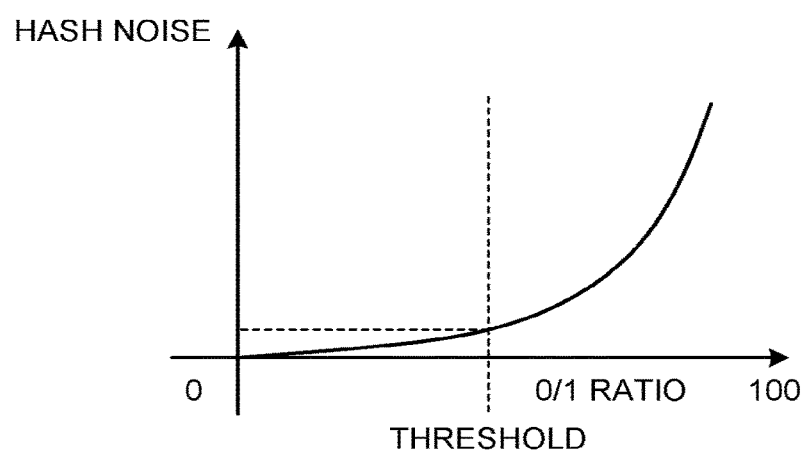
FIG. 2 is a schematic diagram illustrating an example of hash noise.

In the following, hash noise will be described with reference to FIG. 2. FIG. 2 is a schematic diagram illustrating an example of hash noise. As illustrated in FIG. 2, if the 0/1 ratio exceeds the threshold, the hash noise tends to be rapidly increased. Namely, for a bitmap associated with a word, if the 0/1 ratio exceeds the threshold, the hash noise is rapidly increased. Specifically, in a case of an ultra-high frequency word, because the 0/1 ratio exceeds the threshold on the axis (bitmap) associated with the word, if hashing is performed, the hash noise is rapidly increased. Consequently, if the hash noise is rapidly increased, because the bitmap is not correctly restored when, for example, the hashing is restored, other words are adversely affected. Thus, by dividing the bitmap associated with the word in which the 0/1 ratio is greater than the threshold, the index generating device can reduce the hash noise even if the divided bitmap is hashed.

Example of a Bitmap Type Index

Figure 3B:
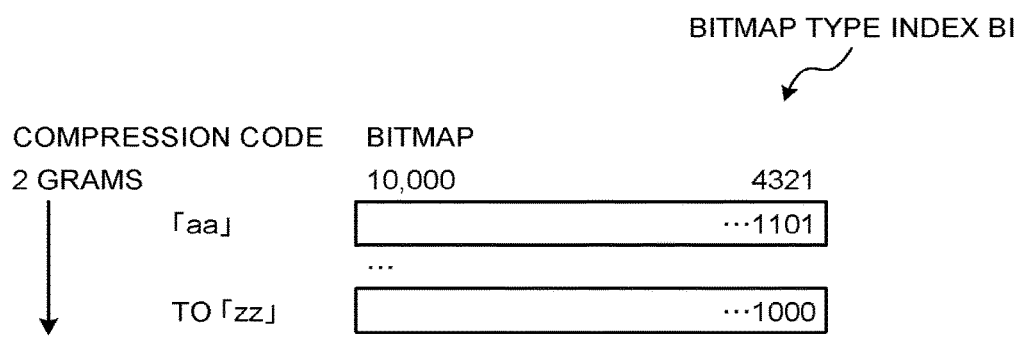
FIG. 3B is a schematic diagram illustrating another example of the bitmap type index according to the embodiment.

In the following, an example of a bitmap type index according to the embodiment will be described with reference to FIGS. 3A and 3B. FIG. 3A is a schematic diagram illustrating an example of a bitmap type index according to the embodiment. As illustrated in FIG. 3A, the bitmap type index BI associates bitmaps with compression codes (associated with word IDs) for each ultra-high frequency word, high frequency word, and low frequency word. The bitmap is code bit strings indicating ultra-high frequency words, high frequency words, and low frequency words are included in which of the compressed files. Each of the bits in the bitmap indicates whether an ultra-high frequency word, a high frequency word, or a low frequency word is included in one of the compressed files. These words are example of elements.

The bitmap type index BI associates bitmaps with, for example, 32-type ultra-high frequency words, 8 K (8000)-type high frequency words, and 16 K (16000)-type low frequency words. The ultra-high frequency words represent the words with a high frequency of appearance when the frequency of appearance of each of the words is aggregated in an appearance frequency aggregation text file group. For example, the ultra-high frequency words are the top 32 words in which the frequency of appearance is high in the frequency aggregation text file group. The high frequency words are the top 8000 words in which the frequency of appearance is high in the frequency aggregation text file group. Furthermore, the low frequency words are the value character strings or the words that are extracted from a file to be encoded and that are ranked less than 24000 regarding the frequency of appearance in the frequency aggregation text file group. An example of a word includes an unknown word. The unknown word is a word that is not included in the ultra-high frequency words and the high frequency words and is a word that has a characteristic of repeatedly appearing in a file to be encoded.

For example, in the first line of the valid line in the bitmap type index BI, the bitmap of the word "the" indicated by the compression code is " . . . 1101". The bitmap in the first line of the valid line in the bitmap type index BI indicates the file that includes therein the compression code of "the". The bitmap " . . . 1101" indicates that, because "1" is stored in the $1^{st}$ bit, "the" is included in a file 1; because "0" is stored in the $2^{nd}$ bit, "the" is not included in a file 2; and, because "1" is stored in the $3^{rd}$ bit, "the" is included in a file 3. Furthermore, the bitmap " . . . 1101" indicates that, because "1" is stored in the $4^{th}$ bit, "the" is included in a file 4. Furthermore, the bitmap " . . . 1101" also indicates whether "the" is included in each of the other files, i.e., the file 5 and the subsequent files.

By using the bitmap type index BI, it is possible to narrow down, at a high speed, information indicating a word constituting an input character string is present in which of the files. For example, it is possible to narrow down, at a high speed, the information indicating the words of "in", "front", "of", and "the" constituting the character string of "in front of the" is present in the "file 1".

In the description above, the bitmap type index BI associates a bitmap with each of the compression codes related to words. However, the bitmap type index BI is not limited to this. For example, a bitmap may also be associated with each of the compression codes related to an N-gram (N is 2 or more) character. Such an N-gram character is another example of element. FIG. 3B is a schematic diagram illustrating another example of the bitmap type index according to the embodiment. FIG. 3B is an example of a case in which an N gram is set to 2 grams. As illustrated in FIG. 3B, the bitmap type index BI associates a bitmap with each of the compression codes related to a 2-gram character. The bitmap mentioned here is a code bit string indicating whether a 2-gram character is included in which of the compressed files. Each of the bits in the bitmap indicates whether a 2-gram character is included in each of the compressed files.

For example, in the first line of the valid line in the bitmap type index BI, the bitmap of the 2-gram character "aa" indicated by the compression code is " . . . 1101". The bitmap in the first line of the valid line in the bitmap type index BI indicates the file that includes therein the compression code of "aa". The bitmap " . . . 1101" indicates that, because "1" is stored in the $1^{st}$ bit, "aa" is included in the file 1; because "0" is stored in the $2^{nd}$ bit, "aa" is not included in the file 2; and, because "1" is stored in the $3^{rd}$ bit, "aa" is included in the file 3. Furthermore, the bitmap " . . . 1101" indicates that, because "1" is included in the $4^{th}$ bit, "aa" is included in the file 4. The bitmap " . . . 1101" also indicates whether "aa" is included in each of the other files of the file 5 and the subsequent files.

Example of Hashed Bitmap Restoration According to the Embodiment

FIGS. 4A and 4B are schematic diagrams each illustrating an example of a hashed bitmap restoration process according to the embodiment. As illustrated in FIGS. 4A and 4B, the hashed bitmap restoration process restores the hashed bitmap to the bitmap associated with the word ID that is obtained by loading the hashing. FIG. 4A indicates the state in which the division destination is not set in the hashed bitmap and FIG. 4B indicates the state in which the division destination is set in the hashed bitmap. The hashed bitmap restoration process is performed when a search is performed such that a word constituting an input character string is present in which of a file.

For example, as illustrated in FIG. 4A, when a search device receives an input of a word and the file ID of the text data, the search device extracts, from the hashed index HI, a plurality of hashed bitmaps associated with the word ID indicated by the received word. The search device determines whether the division destination is set in one of the plurality of the hashed bitmaps. In this case, the search device determines that the division destination is not set to any of the hashed bitmaps.

The search device loads the plurality of the hashed bitmaps to each of the bitmaps (the first restoration process). In this case, regarding the bitmap at the restoration destination of the hashed bitmap with a single base, the search device sets the value of each bit in the hashed bitmap to the position obtained by adding the position of each bit in the hashed bitmap to the value obtained by multiplying an integer (0 or more) by a base. As an example, regarding the bitmap bi21 at the restoration destination of the hashed bitmap h21 with the base 29, the search device sets the value of each bit in the hashed bitmap h21 to the position obtained by adding the position of each bit in the hashed bitmap h21 to the value obtained multiplying "0" by the base 29. Regarding the bitmap bi21 at the restoration destination of the hashed bitmap h21 with the base 29, the search device sets the value of each bit in the hashed bitmap h21 to the position obtained by adding the position of each bit in the hashed bitmap h21 to the value obtained by multiplying "1" by the base 29. The search device repeats until the value of the bit at the maximum bit position in the bitmap bi11 with the base 29 at the restoration destination is set. Similarly, regarding the bitmap bi22 at the restoration destination of the hashed bitmap h22 with the base 31, the search device sets the value of each bit in the hashed bitmap h22 to the position obtained by adding the position of each bit in the hashed bitmap h22 to the value obtained by multiplying "0" by the base 31. Regarding the bitmap bi22 at the restoration destination of the hashed bitmap h22 with the base 31, the search device sets the value of each bit in the hashed bitmap h22 to the position obtained by adding the position of each bit in the hashed bitmap h22 to the value obtained by multiplying "1" by the base 31. The search device repeats this until the value of the bit at the maximum bit position in the bitmap bi22 at the restoration destination is set.

The search device performs an AND operation (a second restoration process) on the bit at the position associated with each of the bitmaps restored in the first restoration process. In this case, the search device performs AND operation between the bitmap bi11 that has been restored from the hashed bitmap h21 with the base 29 and the bitmap bi22 that has been restored from the hashed bitmap h22 with the base 31. The search device outputs the bitmap bit of the AND result as a restoration result.

FIG. 4B indicates the state in which the division destination is set in one of the plurality of the hashed bitmaps. As illustrated in FIG. 4A, the search device performs the first restoration process on the hashed bitmap with the base 29 related to the even numbered bitmap stored in the division destination. The search device performs the first restoration process on the hashed bitmap with the base 31 related to the even numbered bitmap stored in the division destination.

Then, as illustrated in FIG. 4B, by using each of the bitmaps that have been restored by the first restoration process, the search device performs the second restoration process. The AND result of the second restoration process is a bitmap bi30.

Similarly, as illustrated in FIG. 4A, the search device performs the first restoration process on the hashed bitmap with the base 29 related to the odd numbered bitmap stored in the division destination. The search device performs the first restoration process on the hashed bitmap with the base 31 related to the odd numbered bitmap stored in the division destination. Then, as illustrated in FIG. 4B, by using each of the bitmaps restored by the first restoration process, the search device performs the second restoration process. The AND result of the second restoration process is the bitmap bi31.

The search device performs an OR operation (merging process) on the bits at the associated position of each of the bitmaps restored by the second restoration process. In this case, the search device performs the OR operation between the bitmap bi30 and the bitmap bi31. The search device outputs, as the restoration result, a bitmap bi3 that is the OR result.

Example of a Search Process According to the Embodiment

Figure 5:
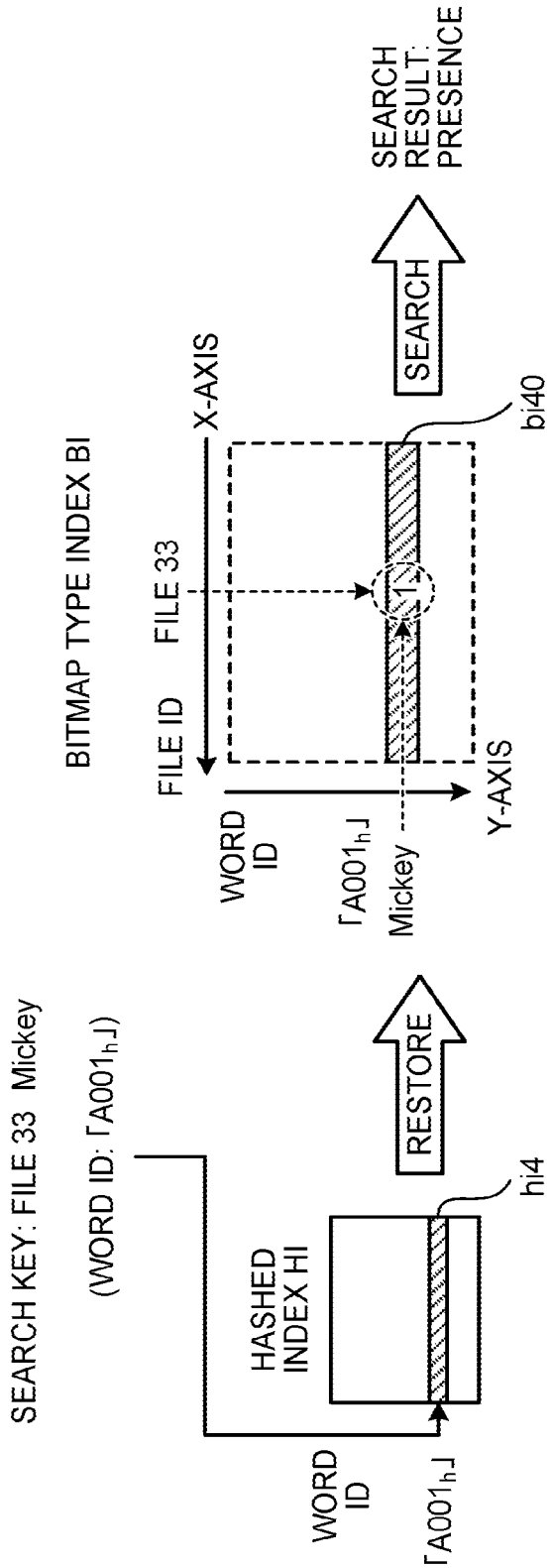
FIG. 5 is a schematic diagram illustrating an example of a search process according to the embodiment.

FIG. 5 is a schematic diagram illustrating an example of a search process according to the embodiment. As illustrated in FIG. 5, when the search device that performs the search process receives an input of a word and the file ID of the text data, the search device extracts, from the hashed index HI, a plurality of hashed bitmaps with respect to the word ID indicated by the received word. In this case, it is assumed that "Mickey" is received as a word and a "file 33" is received as the file ID. Then, the search device extracts, from the hashed index HI, a plurality of hashed bitmaps h41 and h42 with respect to the word ID "A001$_h$" indicated by "Mickey" that has been received as the word.

The search device restores the plurality of the hashed bitmaps with respect to the extracted word ID. The restoration process performed on the plurality of the hashed bitmaps is the process illustrated in FIGS. 4A and 4B. The restoration result is represented by the bitmaps associated with the word ID. In this case, the search device restores a plurality of hashed bitmaps hi4 with respect to the word ID "A001$_h$" and outputs a bitmap bi40 as the restoration result. The plurality of the hashed bitmaps hi4 includes therein a hashed bitmap h41 with the base 29 and a hashed bitmap h42 with the base 31.

Based on presence information that is related to the word indicated by the word ID in each of the plurality of the files and that is indicated by each of the bits in the bitmaps, which is the restoration result, of the word ID, the search device searches for the presence information on the word indicated by the subject word ID associated with the received file ID. As an example, the search device searches for the presence information on the word based on the value of the bit, from among the bits in the bitmap bi40, with respect to the "file 33" that has been received as the file ID. In this case, because the value of the bit with respect to the "file 33" that has been received as the file ID is "1", the search device determines that the word "Mickey" is present in the "file 33". The search device outputs information indicating that the word "Mickey" is present as the search result. Consequently, by restoring the hashed index HI to the bitmap type index BI and by using the restored bitmap type index BI, the search device can narrow down, at a high speed, information indicating a word that constitutes an input character string is present in which of the files.

Furthermore, the word that is received as an input is not limited to a word but may also be a character string formed by a plurality of words. If the word that is received as an input is a character string formed by the plurality of the words, the search device performs a process as follows. Namely, when the search device receives an input of an input character string and a file ID, the search device performs lexical analysis on the received input character string. The lexical analysis mentioned here is the process of dividing an input character string into words. Then, the search device restores, for each word of the plurality of the words that are the result of the lexical analysis, the plurality of the hashed bitmaps associated with the word IDs indicated by the words. Then, the search device extracts, from the bitmap associated with the plurality of the words that are the restoration result, the presence information on the word indicated by the word ID associated with the received file ID. Then, the search device performs the AND operation on the extracted presence information and searches for, based on the AND result, the presence information that is related to the received input character string and that is associated with the received file ID.

For example, a search process performed when a character string formed by a plurality of words is received as an input will be described with reference to FIG. 3. It is assumed that "in front of the" is received as an input character string and the "file 1" is received as the file ID. In such a case, the search device performs lexical analysis on "in front of the" and divides the input character string into words of "in", "front", "of", and "the". The search device extracts, from each of the bitmaps associated with the words "in", "front", "of", and "the", "1" (presence) as the presence information associated with the "file 1". Then, the search device performs the AND operation on the extracted presence information and searches for, based on the AND result of "1", the presence information that is related to the received input character string and that is associated with the "file 1". In this case, the search device outputs the presence as the search result. Consequently, even if the input character string is formed by a plurality of words, the search device can narrow down information indicating that the input character string is present in which of the files.

Configuration of the Index Generating Device According to the Embodiment

Figure 6:
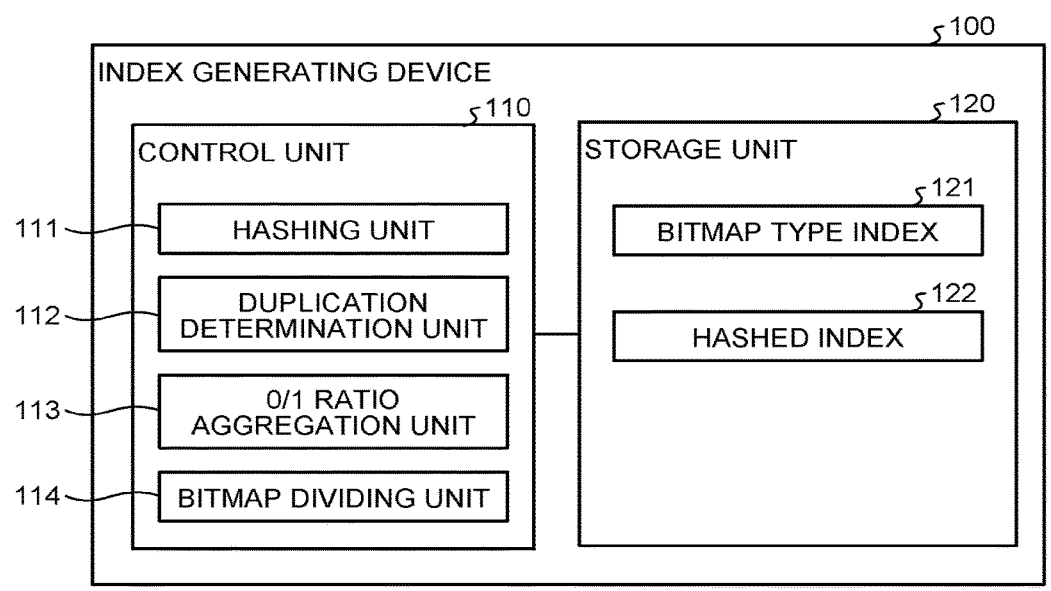
FIG. 6 is a functional block diagram illustrating the configuration of an index generating device according to the embodiment.

In the following, the configuration of an index generating device 100 that performs an index generating process according to the embodiment will be described with reference to FIG. 6. FIG. 6 is a functional block diagram illustrating the configuration of an index generating device according to the embodiment. As illustrated in FIG. 6, the index generating device 100 includes a control unit 110 and a storage unit 120.

The control unit 110 is a processing unit that performs a hashed index generating process illustrated in FIGS. 1A and 1B. The control unit 110 includes an internal memory that stores therein control data and programs in which various kinds of processing procedure are prescribed, whereby the control unit 110 executes various kinds of processes. Furthermore, the control unit 110 corresponds to, for example, an electronic circuit in an integrated circuit, such as an ASIC, an FPGA, or the like. Alternatively, the control unit 110 corresponds to an electronic circuit, such as a CPU, an MPU, or the like. Furthermore, the control unit 110 includes a hashing unit 111, a duplication determination unit 112, a 0/1 ratio aggregation unit 113, and a bitmap dividing unit 114.

The storage unit 120 corresponds to a storage device, such as a nonvolatile semiconductor memory device including, for example, a flash memory, an FRAM (registered trademark), or the like. The storage unit 120 includes a bitmap type index 121 and a hashed index 122. Furthermore, the configuration of the bitmap type index 121 is the same as that illustrated in FIG. 3; therefore, descriptions thereof will be omitted. The configuration of the hashed index 122 is the same as that of the hashed bitmap associated with each of the word IDs (see FIGS. 1A and 1B); therefore, descriptions thereof will be omitted.

The hashing unit 111 hashes, based on a plurality of hash values (bases), each axis (bitmap) of the bitmap type index 121. For example, the hashing unit 111 reads the bitmap type index 121 from the storage unit 120. The hashing unit 111 creates a plurality of hashed bitmaps regarding the bitmaps associated with the respective word IDs included in the read bitmap type index 121. As an example, regarding the bitmaps associated with the respective word IDs, the hashing unit 111 creates each of the hashed bitmaps based on the hash values (bases) of 29 and 31. Namely, the hashing unit 111 sequentially sets each of the bits starting from the $0^{th}$ bit in the bitmap to the corresponding bits starting from the $0^{th}$ bit to the $(base-1)^{th}$ bit in the hashed bitmap. Then, the hashing unit 111 returns again and sets the value obtained by the OR operation with the value that has already been set in the hashed bitmap and that starts from the $0^{th}$ bit in the hashed bitmap.

Furthermore, when the hashing unit 111 creates hashed bitmaps with respect to the bitmaps associated with all of the word IDs, the hashing unit 111 stores, in the storage unit 120, the hashed index 122 in which the created hashed bitmaps are collected.

When a bitmap with respect to the word ID is hashed by the hashing unit 111, the duplication determination unit 112 determines whether "1" is set in the hashed bitmap in a duplicated manner. Namely, the duplication determination unit 112 monitors duplication (collision) of a hash. This determination process is performed on each of the plurality of the hashed bitmaps. If "1" is set in the hashed bitmaps in a duplicated manner, the duplication determination unit 112 sets "1" indicating that duplication occurs in the bit duplication history flag in the hashed bitmap. If is not set in the hashed bitmaps in a duplicated manner, the duplication determination unit 112 sets "0" indicating that duplication does not occur in the bit duplication history flag in the hashed bitmap.

The 0/1 ratio aggregation unit 113 aggregates the 0/1 ratio of the bitmap with respect to the word ID. For example, the 0/1 ratio aggregation unit 113 determines whether "1" is continuously set in the hashed bitmap in a duplicated manner by the duplication determination unit 112. As an example, the 0/1 ratio aggregation unit 113 determines whether "1" indicating the occurrence of duplication has already been set in the bit duplication history flag in the hashed bitmap. Namely, if "1" has already been set in the bit duplication history flag in of the hashed bitmap, the 0/1 ratio aggregation unit 113 determines that "1" is continuously set in a duplicated manner at the time of immediately previous hashing and hashing this time. Then, if "1" is continuously set in hashed bitmap in a duplicated manner, the 0/1 ratio aggregation unit 113 aggregates the 0/1 ratio of the bitmap associated with the word ID associated with the subject hashed bitmap. The 0/1 ratio aggregation unit 113 determines whether the ratio of "1" is greater than the threshold. If the ratio of "1" is greater than the threshold, the 0/1 ratio aggregation unit 113 determines that hash noise is rapidly increased and then allows the bitmap dividing unit 114, which will be described later, to divide the bitmap.

The bitmap dividing unit 114 divides the bitmap associated with the word ID. For example, if the 0/1 ratio aggregation unit 113 determines that the ratio of "1" in the bitmap associated with the word ID is greater than the threshold, the bitmap dividing unit 114 divides the bitmap with respect to the word ID associated with the hashed bitmap. As an example, the bitmap dividing unit 114 extracts the bits at the even numbered position in the bitmap with respect to the word ID associated with the hashed bitmap. The bitmap dividing unit 114 initializes all of the bits in the new bitmap to "0" and sets, after the initialization, the extracted bits at the even numbered position. The bitmap dividing unit 114 extracts the bits at the odd numbered position in the bitmap of the word ID associated with the hashed bitmap. The bitmap dividing unit 114 initializes all of the bits in the new bitmap to "0" and sets, after the initialization, the extracted bits positioned at the odd numbered position. Then, the bitmap dividing unit 114 sets "1" indicating that dividing has been performed in a division history flag with respect to one of the plurality of the hashed bitmaps. In addition, the bitmap dividing unit 114 sets the division destination for this hashed bitmap and stores the divided bitmaps in the division destination. The division destination of the divided bitmaps is an area of, for example, a low frequency word.

Flowchart of the Index Generating Process

Figure 7:
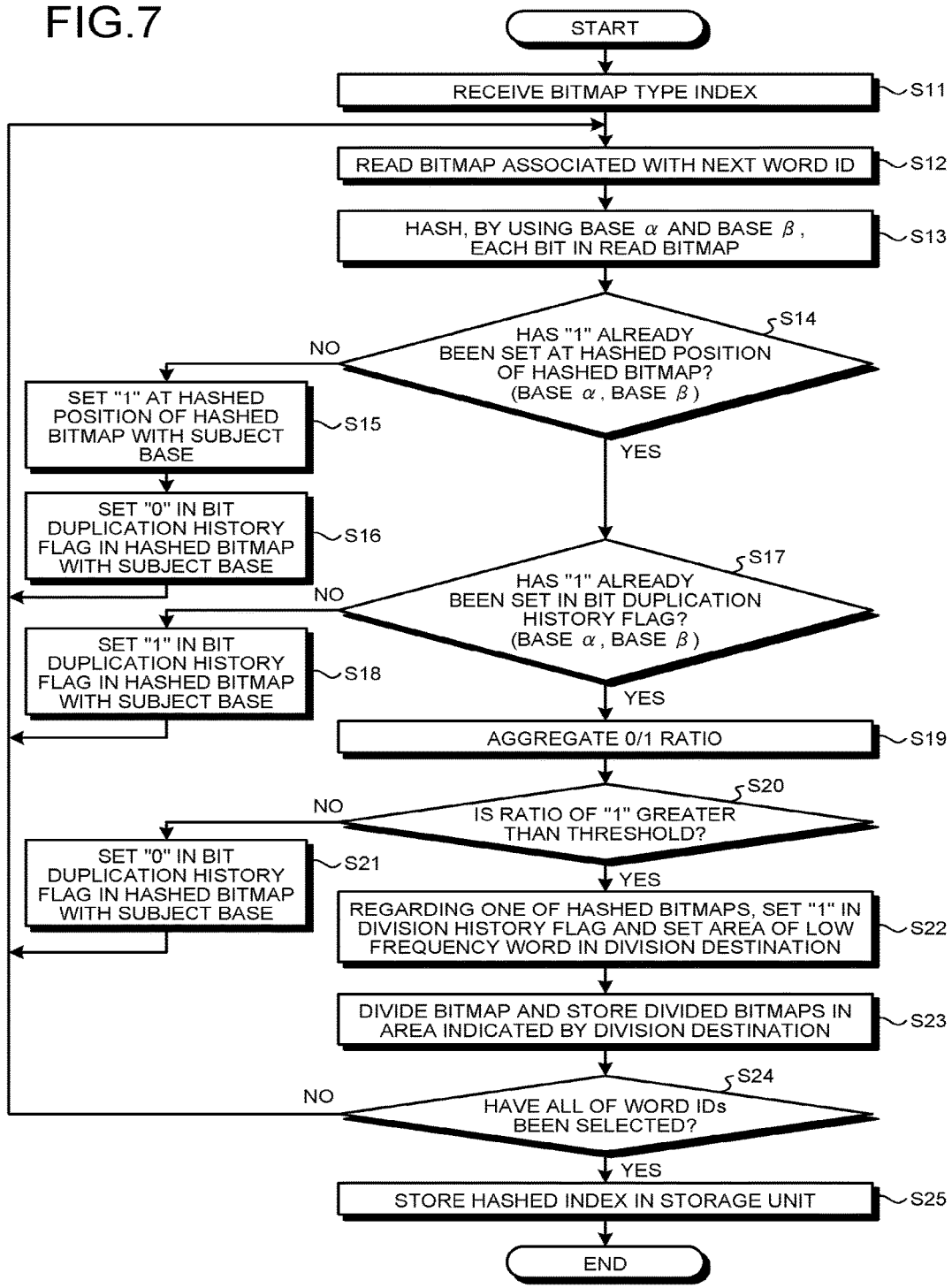
FIG. 7 is a flowchart illustrating an example of the flow of an index generating process according to the embodiment.

FIG. 7 is a flowchart illustrating an example of the flow of an index generating process according to the embodiment.

First, the index generating device 100 receives the bitmap type index 121 (Step S11). Then, the index generating device 100 reads, from the received bitmap type index 121, the bitmap associated with the next word ID (Step S12).

The index generating device 100 hashes, by using a base α and a base β, each of the bits in the read bitmap (Step S13). For example, regarding the hashed bitmap with the base α, the index generating device 100 sets the value of each of the bits at the position of the remainder obtained by dividing the position of each of the bits in the bitmap associated with the word ID by the base α. Regarding the hashed bitmap with the base β, the index generating device 100 sets the value of each of the bits at the position of the remainder obtained by dividing the position of each of the bits in the bitmap associated with the word ID by the base β. Namely, the index generating device 100 sequentially sets each of the bits starting from the $0^{th}$ bit in a bitmap associated with the word ID to the bits starting from the $0^{th}$ bit in a hashed bitmap and, if the index generating device 100 completes the setting of up to the $(base-1)^{th}$ bit, the index generating device 100 returns again and sets the result of the OR operation starting from the $0^{th}$ bit.

The index generating device 100 determines whether "1" has already been set at the hashed position of the hashed bitmap (Step S14). Furthermore, this determination is performed for each of the base α and the base β. If the index generating device 100 determines that "1" has not been set at the hashed position of the hashed bitmap (No at Step S14), the index generating device 100 sets "1" at the hashed position of the hashed bitmap with the subject base (Step S15). Then, the index generating device 100 sets "0" (unduplicated) in the bit duplication history flag of the hashed bitmap with the subject base (Step S16). Then, in order to select the subsequent word ID, the index generating device 100 proceeds to Step S12.

In contrast, if the index generating device 100 determines that "1" has already been set at the hashed position of the hashed bitmap (Yes at Step S14), the index generating device 100 determines whether "1" (duplicated) has already been set in the bit duplication history flag (Step S17). Furthermore, this determination is performed foe each of the base α and the base β. If the index generating device 100 determines that "1" (duplicated) has not been set in the bit duplication history flag (No at Step S17), the index generating device 100 sets "1" (duplicated) in the bit duplication history flag in the hashed bitmap with the subject base (Step S18). Then, in order to select the subsequent word ID, the index generating device 100 proceeds to Step S12.

In contrast, if the index generating device 100 determines that "1" (duplicated) has already been set in the bit duplication history flag (Yes at Step S17), the index generating device 100 aggregates the 0/1 ratio of the bitmap associated with the hashed bitmap with the subject base (Step S19). The index generating device 100 determines whether the ratio of "1" is greater than the threshold (Step S20). If the index generating device 100 determines that the ratio of "1" is not greater than the threshold (No at Step S20), the index generating device 100 sets "0" (unduplicated) in the bit duplication history flag in the hashed bitmap with the subject base (Step S21). Then, the index generating device 100 proceeds to Step S12 in order to select the subsequent word ID.

In contrast, if the index generating device 100 determines that the ratio of "1" is greater than the threshold (Yes at Step S20), the index generating device 100 sets the following information to the one of the hashed bitmaps. Namely, the index generating device 100 sets "1" (divided) in the division history flag and sets an area of a low frequency word in the division destination (Step S22).

Then, the index generating device 100 divides the bitmap associated with the current word ID and stores the divided bitmaps in the area indicated by the division destination (Step S23). For example, the index generating device 100 extracts the bits at the even numbered position in the bitmap associated with the current word ID. The index generating device 100 initializes all of the bits in the new bitmap to "0" and sets, after the initialization, the extracted bits at the even numbered position. The index generating device 100 extracts the bits at the odd numbered position in the bitmap associated with the current word ID. The index generating device 100 initializes all of the bits in the new bitmap to "0" and sets, after the initialization, the extracted bits at the odd numbered position. The index generating device 100 stores the newly divided bitmaps in the area of a low frequency word indicated by the division destination.

Then, the index generating device 100 determines whether all of the word IDs have been selected (Step S24). If the index generating device 100 determines that all of the word IDs have not been selected (No at Step S24), the index generating device 100 proceeds to Step S12 in order to select the subsequent word ID.

In contrast, if the index generating device 100 determines that all of the word IDs have been selected (Yes at Step S24), the index generating device 100 stores the hashed index 122 obtained by combining the created hashed bitmaps in the storage unit 120 (Step S25). Then, the index generating device 100 ends the index generating process. Furthermore, if an index is generated in the compression process performed on text data, because the word ID and the file ID are determined by the lexical analysis, it is possible to omit an output of the storage unit to the bitmap type index and it is possible to directly generate a hashed index.

Configuration of a Search Device According to the Embodiment

Figure 8:
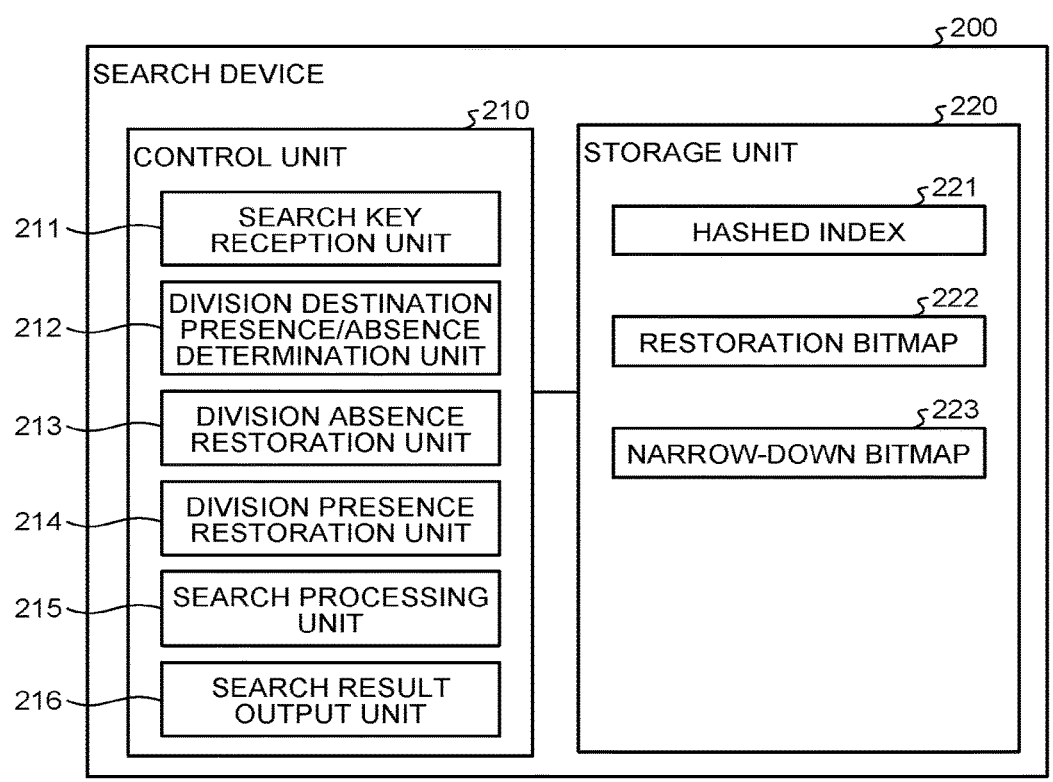
FIG. 8 is a functional block diagram illustrating the configuration of a search device according to the embodiment.

In the following, the configuration of a search device 200 that performs a search process according to the embodiment will be described with reference to FIG. 8. FIG. 8 is a functional block diagram illustrating the configuration of a search device according to the embodiment. As illustrated in FIG. 8, the search device 200 includes a control unit 210 and a storage unit 220.

The control unit 210 is a processing unit that performs a search process illustrated in FIG. 5. The control unit 210 includes an internal memory that stores therein control data and programs in which various kinds of processing procedure are prescribed, whereby the control unit 210 executes various kinds of processes. Furthermore, the control unit 210 corresponds to, for example, an electronic circuit in an integrated circuit, such as an ASIC, an FPGA, or the like. Alternatively, the control unit 210 corresponds to an electronic circuit, such as a CPU, an MPU, or the like. Furthermore, the control unit 210 includes a search key reception unit 211, a division destination presence/absence determination unit 212, a division absence restoration unit 213, a division presence restoration unit 214, a search processing unit 215, and a search result output unit 216.

The storage unit 220 corresponds to a storage device, such as a nonvolatile semiconductor memory device including, for example, a flash memory, an FRAM (registered trademark), or the like. The storage unit 220 includes a hashed index 221, a restoration bitmap 222, and a narrow-down bitmap 223. Furthermore, the configurations of the hashed index 221 and the restoration bitmap are the same as those of the hashed bitmap and the bitmap associated with each of the word IDs (see FIGS. 1A and 1B); therefore, descriptions thereof will be omitted. Furthermore, the configuration of the narrow-down bitmap 223 is the same as that of each of the words and the bitmap associated with the AND result (see FIG. 3); therefore, descriptions thereof will be omitted.

The search key reception unit 211 receives a search key. For example, the search key reception unit 211 receives a word targeted for a search and the file ID targeted for a search as a search key.

The division destination presence/absence determination unit 212 determines, by using the hashed bitmap associated with the word targeted for the search, whether the division destination is present. For example, the division destination presence/absence determination unit 212 extracts, from the hashed index 221, a plurality of hashed bitmaps with respect to the word ID indicated by the word targeted for the search. The division destination presence/absence determination unit 212 determines which of the hashed bitmaps from among the plurality of extracted hashed bitmaps is used to set the division destination. As an example, the division destination presence/absence determination unit 212 determines which of the division history flags in the hashed bitmap contains "1" that indicates that dividing has been performed. If "1" is set, the division destination presence/absence determination unit 212 determines that the division destination is "present". If "0" is set, the division destination presence/absence determination unit 212 determines that the division destination is "not present".

If the division destination presence/absence determination unit 212 determines that the division destination is "not present", the division absence restoration unit 213 restores the plurality of the hashed bitmaps associated with the word targeted for the search.

For example, the division absence restoration unit 213 loads the plurality of the hashed bitmaps into the bitmaps (the first restoration process). As an example, regarding the bitmap at the restoration destination of the hashed bitmap with the base 29, the division absence restoration unit 213 sets the value of each of the bits in the hashed bitmap to the position obtained by adding the position of each of the bits in the hashed bitmap to the value obtained by multiplying the base 29 by an integer (0 or more). Regarding the bitmap at the restoration destination of the hashed bitmap with the base 31, the division absence restoration unit 213 sets the value of each of the bits in the hashed bitmap to the position obtained by adding the position of each of the bits in the hashed bitmap to the value obtained by multiplying an integer (0 or more) by the base 31. Namely, the division absence restoration unit 213 sequentially sets each of the bits starting from the $0^{th}$ bit in a hashed bitmap into the bits starting from the $0^{th}$ bit in the bitmap at the restoration destination and processes up to the $(base-1)^{th}$ bit. Then, the division absence restoration unit 213 returns again and sets the value of the hashed bitmap starting from the $0^{th}$ bit in the hashed bitmap.

Furthermore, the division absence restoration unit 213 performs an AND operation (the second restoration process) on the bits at the position associated with the bitmaps loaded in the first restoration process. As an example, the division absence restoration unit 213 performs the AND operation between the bitmap obtained by loading the hashed bitmap with the base 29 and the bitmap obtained by loading the hashed bitmap with the base 31. Then, the division absence restoration unit 213 outputs, to the search processing unit 215, the bitmap of the AND result as the restoration result.

If the division destination presence/absence determination unit 212 determines that the division destination is "present", the division presence restoration unit 214 restores the hashed bitmap at the division destination.

For example, the division presence restoration unit 214 loads, in each of the bitmaps, the plurality of the hashed bitmaps with the even number stored in the division destination of the hashed bitmap that is determined to be "present" (the first restoration process). The division presence restoration unit 214 performs the AND operation on the bits at the position associated with each of the bitmaps loaded in the first restoration process and outputs the bitmap with the even number (the second restoration process). Furthermore, the division presence restoration unit 214 loads, in each of the bitmaps, the plurality of the hashed bitmaps with the odd number stored in the division destination of the hashed bitmap that is determined to be "present" (the first restoration process). The division presence restoration unit 214 performs the AND operation on the bits at the positions associated with the bitmaps loaded in the first restoration process and outputs the bitmap with the odd number (the second restoration process). Furthermore, the first restoration process and the second restoration process are the same as those performed by the division absence restoration unit 213; therefore, descriptions thereof will be omitted.

Furthermore, the division presence restoration unit 214 performs the OR operation (merging process) between the bitmap with the even number restored in the second restoration process and the bitmap with the odd number restored in the second restoration process. Then, the division presence restoration unit 214 outputs the bitmaps of the OR result to the search processing unit 215 as the restoration result.

The search processing unit 215 searches for, based on the bitmap associated with the word targeted for the search, the presence information on the subject word associated with the file ID targeted for the search. For example, from among each of the bits in the bitmap of the restoration result, the search processing unit 215 searches for the presence information on the word targeted for the search based on the value of the bits with respect to the file ID targeted for the search.

The search result output unit 216 outputs the result of the search performed by the search processing unit 215. For example, if the presence information is "1", the search result output unit 216 outputs information, as the search result, indicating the presence. If the presence information is "0", the search result output unit 216 outputs information, as the search result, indicating the absence.

Flowchart of the Search Process

Figure 9:
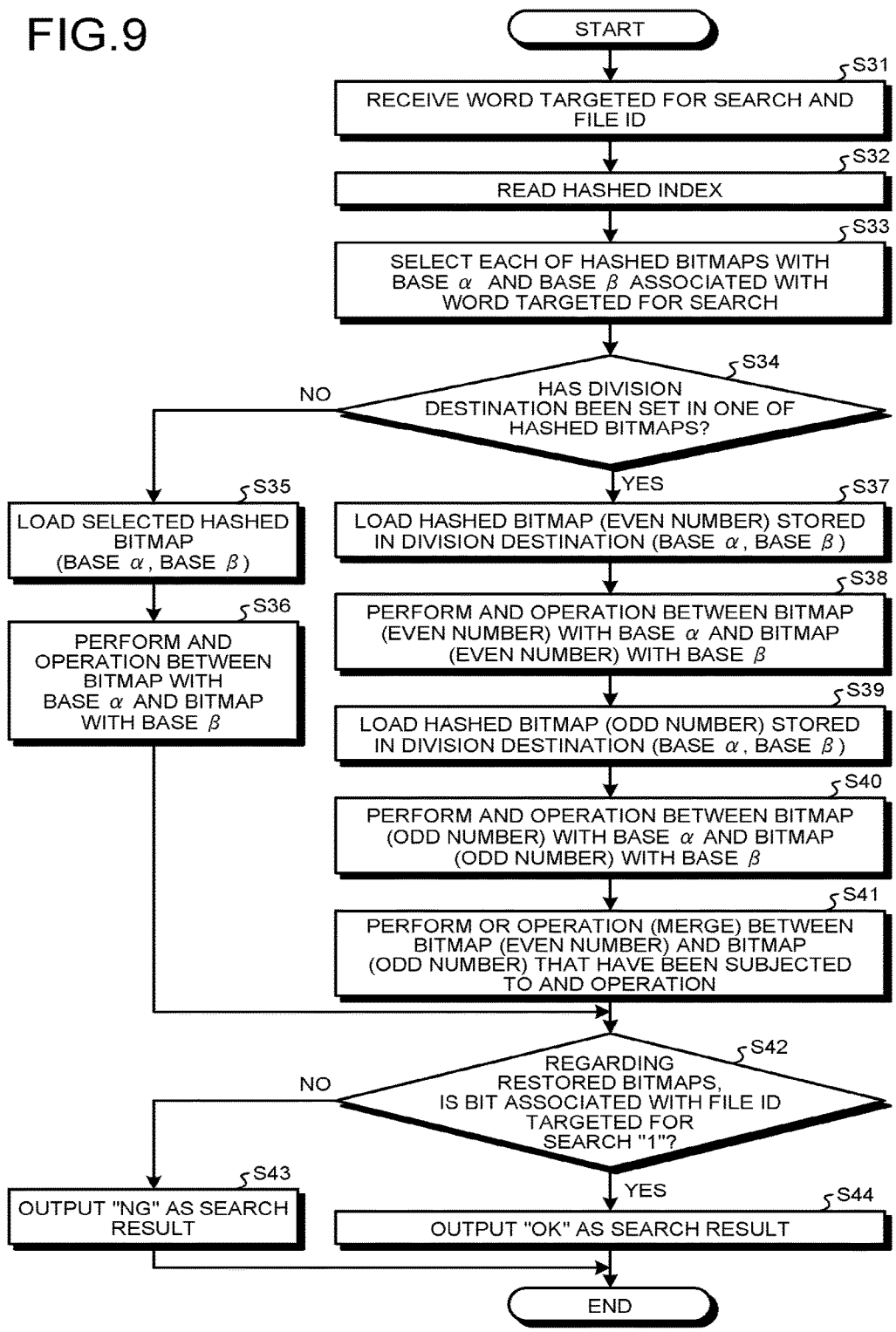
FIG. 9 is a flowchart illustrating an example of the flow of the search process according to the embodiment.

FIG. 9 is a flowchart illustrating an example of the flow of the search process according to the embodiment.

First, the search device 200 receives the word targeted for a search and the file ID (Step S31). The search device 200 reads the hashed index 221 from the storage unit 220 (Step S32). The search device 200 selects, from the read hashed index 221, each of the hashed bitmaps with the base α and the base β associated with the word ID indicated by the word targeted for the search (Step S33).

The search device 200 determines the division destination has been set in one of the hashed bitmaps (Step S34). If the search device 200 determines that the division destination is set in neither the hashed bitmaps (No at Step S34), the search device 200 loads the selected hashed bitmap (Step S35). Furthermore, this restoration process is performed for each of the hashed bitmaps with the base α and the base β. Namely, the search device 200 performs the first restoration process on the hashed bitmap with the base α. The search device 200 performs the first restoration process on the hashed bitmap with the base β.

Then, the search device 200 performs the AND operation between the bitmap with the base α and the bitmap with the base β (Step S36). Namely, the search device 200 performs the second restoration process by using the bitmap with the base α and the bitmap with the base β that are restored by the first restoration process. Then, the search device 200 proceeds to Step S42 in order to perform the search process on the restored bitmap.

In contrast, if the search device 200 determines that the division destination is set in one of the hashed bitmaps (Yes at Step S34), the search device 200 loads the hashed bitmap (even number) stored in the division destination (Step S37). This restoration process is performed for each hashed bitmap (even number) with the base α and the base β. Namely, the search device 200 performs the first restoration process on the hashed bitmap (even number) with the base α. The search device 200 performs the first restoration process on the hashed bitmap (even number) with the base β.

Then, the search device 200 performs the AND operation between the bitmap (even number) with the base α and the bitmap (even number) with the base β (Step S38). Namely, the search device 200 performs the second restoration process by using the bitmap (even number) with the base α and the bitmap (even number) with the base β that are restored by the first restoration process.

Subsequently, the search device 200 loads the hashed bitmap (odd number) stored in the division destination (Step S39). This restoration process is performed for each hashed bitmap (odd number) with the base α and the base β. Namely, the search device 200 performs the first restoration process on the hashed bitmap (odd number) with the base α. The search device 200 performs the first restoration process on the hashed bitmap (odd number) with the base β.

Then, the search device 200 performs the AND operation between the bitmap (odd number) with the base α and the bitmap (odd number) with the base β (Step S40). Namely, the search device 200 performs the second restoration process by using the bitmap (odd number) with the base α and the bitmap (odd number) with the base β that are restored by the first restoration process.

Then, the search device 200 performs the OR operation (merge) between the bitmap (even number) and the bitmap (odd number) that have been subjected to the AND operation (Step S41). Namely, the search device 200 performs the merging process by using the bitmap (even number) and the bitmap (odd number) that are restored by the second restoration process. Then, the search device 200 proceeds to Step S42 in order to perform the search process on the restored bitmap.

At Step S42, the search device 200 determines, regarding the restored bitmaps, whether the bit associated with the file ID targeted for a search is "1" (Step S42). If the search device 200 determines that the subject bit is not "1" (No at Step S42), the search device 200 outputs "NG" indicating the absence as the search result (Step S43). Then, the search device 200 ends the search process.

In contrast, if the search device 200 determines that the subject bit is "1" (Yes at Step S42), the search device 200 outputs "OK" indicating the presence as the search result (Step S44). Then, the search device 200 ends the search process.

Effect of the Embodiment

According to the embodiment described above, regarding each of a plurality of elements included in at least one of a plurality of files, the index generating device 100 generates presence information related to the plurality of the files. Furthermore, when the index generating device 100 generates hashed index information from the presence information by using a plurality of hashed axes, to which a plurality of hash functions are applied, with respect to the axes of the plurality of the files, the index generating device 100 detects collision data corresponding to data elements that are independent in the presence information with the first axis and the second axis and duplicating in the hashed index information with the first axis and the plurality of hashed axes. If the detected collision satisfies a specific condition, the index generating device 100 sets and links, regarding each of the pieces of the collision data, an additional value to one of the plurality of hashed axes. With this configuration, if a collision occurs in hashed index information due to a specific condition, the index generating device 100 can avoid the collision by extending one of the axes from among the plurality of hashed axes.

Furthermore, according to the embodiment described above, if a collision continuously occurs in one of the plurality of hashed axes, the index generating device 100 aggregates the presence/absence ratio by using the presence information related to the element that is associated with the hashed axis in which the collisions have occurred. If the presence ratio of the aggregated presence/absence ratio is greater than a threshold, the index generating device 100 divides the presence information related to the element. The index generating device 100 sets and links a division destination to one of the plurality of hashed axes. With this configuration, by dividing the presence information related to the element and by extending the axis of the presence information, the index generating device 100 can reduce hash noise.

Furthermore, according to the embodiment described above, the index generating device 100 uses the size of the hashed axis as the number of bits matched with the size of the register. With this configuration, by matching the size of the hashed axis with the size of the register, the index generating device 100 can perform the logical operation on the plurality of hashed axes at a high speed, can hash bitmaps at a high speed, and can restore the hashed bitmaps at a high speed.

Another Embodiment Related to the Embodiment

In the following, a part of a modification of the above described embodiment will be described. In addition to the modification described below, design changes can be appropriately made without departing from the scope of the present invention.

Furthermore, on the assumption of a 32-bit register, the index generating device 100 according to the embodiment hashes each of the bitmaps based on the hash values (bases) of 29 and 31. In the embodiment, the description has been given with the assumption that a single bitmap contains 44 bits. However, the hash values (bases) of 29 and 31 are examples and are not limited to these. The number of bits in the bitmap is also an example and is not limited to this. These two hash values (bases) may be determined in accordance with the number of types of each of the words in the plurality of the files. For example, if the number of different words is 10000, two bases are selected such that the matrix represented by the remainder obtained by performing a division using one of the base and represented by the remainder obtained by performing a division using the other one of the bases becomes about 10000. If the number of matrices is 10000, the two prime numbers to be selected are, for example, 97 and 101. Namely, this is based on the speculation that, in a matrix space in which the least common multiple is about 10000, regarding a certain word, a pair of the remainders obtained from one of hashes and the other one of hashes does not collide (duplicate) with a pair of the remainders obtained about the other words.

Furthermore, the index generating device 100 according to the embodiment generates, based on a plurality of adjacent hash values (bases), a hashed index by using two-dimensional (the axis of words and the axis of files) hashing. However, instead of the axis of files, the index generating device 100 may also use the axis of blocks. Namely, the presence information on a word ID may also be in units of blocks.

Furthermore, the bitmap type index HI according to the embodiment is represented in a two-dimensional manner. Namely, the X-axis represents the file IDs and the Y-axis represents the word IDs. However, the bitmap type index BI may also be represented in a three-dimensional manner. For example, the X-axis represents the $1^{st}$ gram word ID, the Y-axis represents the $2^{nd}$ gram word ID, and the Z-axis represents the file ID. In such a case, regarding the two-dimensional space represented by the X-axis and the Z-axis, the index generating device 100 may hash each of the bitmaps based on the two hash values (bases). In addition, regarding the two-dimensional space represented by the Y-axis and the Z-axis, the index generating device 100 may hash each of the bitmaps based on the two hash values (bases). Then, when the search device 200 receives an input of a 2-gram character string and the file ID, the search device 200 may perform the search process as follows. First, the search device 200 restores a plurality of hashed bitmaps with respect to the word ID indicated by the $1^{st}$ gram word. Based on the presence information that is related to each of the words indicated by the corresponding word IDs in the plurality of files and that is indicated by each of the bits, in the bitmap that is the restoration result, of the corresponding word IDs of the $1^{st}$ gram word, the search device 200 searches for the presence information on the word indicated by the subject word ID associated with the received file ID. Then, the search device 200 restores the plurality of hashed bitmaps with respect to the word ID indicated by the $2^{nd}$ gram word. Based on the presence information that is related to each of the words indicated by the corresponding word IDs in the plurality of files and that is indicated by each of the bits, in the bitmap that is the restoration result, of the corresponding word IDs of the $2^{nd}$ gram word, the search device 200 searches for the presence information on the word indicated by the subject word ID associated with the received file ID. Then, the search device 200 performs the AND operation between the presence information on the $1^{st}$ gram word and the presence information on the $2^{nd}$ gram word and then searches for the presence information on a 2 grams character string.

Furthermore, the information processing apparatus 100 according to the embodiment creates a Zelkova serrata tree as the tree structure associated with the compression dictionary. However, the information processing apparatus 100 is not limited to this and may also create a Huffman tree as the tree structure associated with the compression dictionary. Namely, the information processing apparatus 100 may allocate a word for each attribute to a leaf that constitutes the Huffman tree associated with each of the compression dictionaries and may set, in each of the leaves, a pointer to a compression code of the associated word, a pointer to an attribute, and a pointer to a word. Then, by using the Huffman tree, the information processing apparatus 100 performs internal encoding on the source code with a compressed state and performs syntactic analysis and interpret by using the internal encoding.

Furthermore, the flow of the processes, the control procedures, the specific names, and the information containing various kinds of data or parameters indicated in the embodiment can be arbitrarily changed unless otherwise stated.

Hardware Configuration of the Information Processing Apparatus

Figure 10:
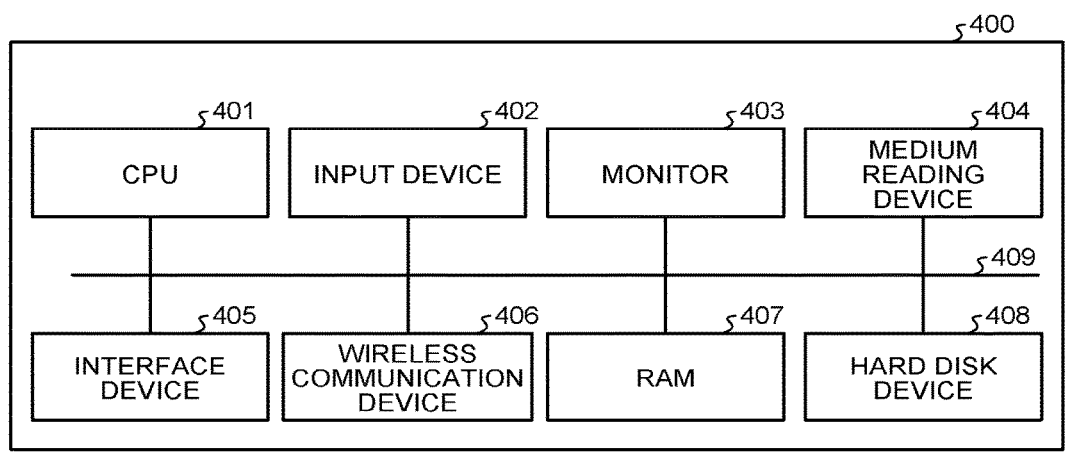
FIG. 10 is a schematic diagram illustrating the hardware configuration of an information processing apparatus according to the embodiment.

The hardware configuration of an information processing apparatus that includes the index generating device 100 and the search device 200 according to the embodiment will be described with reference to FIG. 10. FIG. 10 is a schematic diagram illustrating the hardware configuration of an information processing apparatus according to the embodiment. As illustrated in FIG. 10, a computer 400 includes a CPU 401 that executes various kinds of arithmetic processing, an input device 402 that receives an input of data from a user, and a monitor 403. Furthermore, the computer 400 includes a medium reading device 404 that reads programs or the like from a storage medium, an interface device 405 for connecting to another device, a wireless communication device 406 that is used to wirelessly connect to the other device. Furthermore, the computer 400 includes a RAM 407 that temporarily stores therein various kinds of information and a hard disk device 408. Furthermore, each of the devices 401 to 408 is connected to a bus 409.

The hard disk device 408 stores therein an index generating program having the same function as that performed by each of the processing units, such as the hashing unit 111, the duplication determination unit 112, the 0/1 ratio aggregation unit 113, and the bitmap dividing unit 114 illustrated in, for example, FIG. 6. Furthermore, the hard disk device 408 stores therein various kinds of data that is used to implement the index generating program. The hard disk device 408 stores therein a search program having the same function as that performed by each of the processing units, such as the division destination presence/absence determination unit 212, the division absence restoration unit 213, the division presence restoration unit 214, and the search processing unit 215 illustrated in, for example, FIG. 8. Furthermore, the hard disk device 408 stores therein various kinds of data that is used to implement the search program.

The CPU 401 reads each of the programs stored in the hard disk device 408 and loads the programs in the RAM 407, thereby performing various kinds of processes. These programs allows the computer 400 to function as, for example, the hashing unit 111, the duplication determination unit 112, the 0/1 ratio aggregation unit 113, and the bitmap dividing unit 114 illustrated in FIG. 6. These programs allows the computer 400 to function as, for example, the division destination presence/absence determination unit 212, the division absence restoration unit 213, the division presence restoration unit 214, and the search processing unit 215 illustrated in FIG. 8.

Furthermore, the index generating program and the search program described above do not always need to be stored in the hard disk device 408. For example, the computer 400 may also read and execute the programs stored in a computer readable storage medium. Example of the computer readable storage medium include a portable recording medium, such as a CD-ROM, a DVD disk, or a universal serial bus (USB) memory; a semiconductor memory, such as a flash memory; and a hard disk drive. Furthermore, the program may also be stored in a device connected to, for example, a public circuit, the Internet, a local area network (LAN), or the like and the computer 400 may also read and execute the programs from the recording medium described above.

Figure 11:
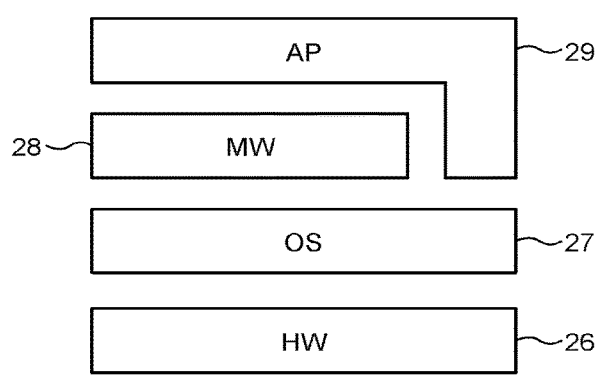
FIG. 11 is a schematic diagram illustrating a configuration example of a program operated in a computer.

FIG. 11 is a schematic diagram illustrating a configuration example of a program operated in a computer. In the computer 400, an operating system (OS) 27 that controls a hardware group 26 (401 to 409) illustrated in FIG. 11 is operated. The CPU 401 is operated in accordance with the procedure of the OS 27 and then control and management of the hardware group 26 is performed, whereby the processes in accordance with an application program 29 or middleware 28 are performed in the hardware group 26. Furthermore, in the computer 400, the middleware 28 or the application program 29 is read into the RAM 407 and is executed by the CPU 401.

For example, if an index generation instruction is received by the CPU 401, by performing processes based on at least a part of the middleware 28 or the application program 29, (by controlling the hardware group 26 based on the OS 27) the index generation function performed by the control unit 110 is implemented. The index generation function may also be included in the application program 29 itself or may be a part of the middleware 28 that is executed by being called in accordance with the application program 29. If a search key is received by the CPU 401, by performing processes based on at least a part of the middleware 28 or the application program 29, (by controlling the hardware group 26 based on the OS 27) the search function performed by the control unit 210 is implemented. The search function may also be included in the application program 29 itself or may be a part of the middleware 28 that is executed by being called in accordance with the application program 29.

According to an aspect of an embodiment, a decrease in the accuracy due to a collision can be avoided when a bitmap type index is hashed.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein an index generating program that causes a computer to execute a process comprising:

generating presence information of a plurality of pieces of text data, the presence information including whether each of a plurality of elements, included at least one of the plurality of pieces of text data, is present for each of the plurality of pieces of text data, the presence information including a first axis for the plurality of elements and a second axis for the plurality of pieces of text data;

detecting collision data for hashed index information when generating the hashed index information, the hashed index information being generated from the presence information and including a plurality of hashed axes, the plurality of hashed axes being generated by applying a plurality of hash functions to the second axis of the presence information, the collision data corresponding to data elements that are independent in the presence information with the first axis and the second axis and duplicating in the hashed index information with the first axis and the plurality of hashed axes; and setting additional values to each of a plurality of specific collision data, respectively, for one of the plurality of hashed axes, the plurality of specific collision data being the detected collision data and satisfying a specific condition, wherein by dividing a bitmap that has not been hashed into even numbered data and odd numbered data, and by using prime numbers as a basis of the plurality of hash functions, a collision of data is avoided, each hash function of the plurality of hash functions has a different prime base, and each hash function of the plurality of hash functions is applied for each of bitmaps associated with a corresponding word identifications, and creates a plurality of hashed bitmaps.

2. The non-transitory computer-readable recording medium according to claim 1, wherein the linking includes aggregating, when a collision continuously occurs in one of the plurality of hashed axes, the presence/absence ratio by using the presence information related to the element that is associated with the hashed axis in which the collisions have occurred, dividing, when the presence ratio of the aggregated presence/absence ratio is greater than a threshold, the presence information related to the element, and setting and linking a division destination to one of the plurality of hashed axes.

3. The non-transitory computer-readable recording medium according to claim 2, wherein the division destination used when the presence information related to the element is divided is an area of a low frequency word of the element.

4. The non-transitory computer-readable recording medium according to claim 1, wherein the size of the hashed axis is a number of bits matched with the size of a register.

5. The non-transitory computer-readable recording medium according to claim 1, wherein a unit of the plurality of elements is a unit of words.

6. The non-transitory computer-readable recording medium according to claim 1, wherein a unit of the plurality of elements is a unit of characters with an N grams (N is 2 or more).

7. An index generating method comprising:
generating presence information of a plurality of pieces of text data, the presence information including whether each of a plurality of elements, included at least one of the plurality of pieces of text data, is present for each of the plurality of pieces of text data, the presence information including a first axis for the plurality of elements and a second axis for the plurality of pieces of text data, by a processor;
detecting collision data for hashed index information when generating the hashed index information, the hashed index information being generated from the presence information and including a plurality of hashed axes, the plurality of hashed axes being generated by applying a plurality of hash functions to the second axis of the presence information, the collision data corresponding to data elements that are independent in the presence information with the first axis and the second axis and duplicating in the hashed index information with the first axis and the plurality of hashed axes, by the processor; and
setting additional values to each of a plurality of specific collision data, respectively, for one of the plurality of hashed axes, the plurality of specific collision data being the detected collision data and satisfying a specific condition, by the processor, wherein
by dividing a bitmap that has not been hashed into even numbered data and odd numbered data, and by using prime numbers as a basis of the plurality of hash functions, a collision of data is avoided,
each hash function of the plurality of hash functions has a different prime base, and
each hash function of the plurality of hash functions is applied for each of bitmaps associated with a corresponding word identifications, and creates a plurality of hashed bitmaps.

8. An index generating device comprising:
a processor that executes a process including:
generating presence information of a plurality of pieces of text data, the presence information including whether each of a plurality of elements, included at least one of the plurality of pieces of text data, is present for each of the plurality of pieces of text data, the presence information including a first axis for the plurality of elements and a second axis for the plurality of pieces of text data;
detecting collision data for hashed index information when generating the hashed index information, the hashed index information being generated from the presence information and including a plurality of hashed axes, the plurality of hashed axes being generated by applying a plurality of hash functions to the second axis of the presence information, the collision data corresponding to data elements that are independent in the presence information with the first axis and the second axis and duplicating in the hashed index information with the first axis and the plurality of hashed axes; and
setting additional values to each of a plurality of specific collision data, respectively, for one of the plurality of hashed axes, the plurality of specific collision data being the detected collision data and satisfying a specific condition, wherein
by dividing a bitmap that has not been hashed into even numbered data and odd numbered data, and by using prime numbers as a basis of the plurality of hash functions, a collision of data is avoided,
each hash function of the plurality of hash functions has a different prime base, and
each hash function of the plurality of hash functions is applied for each of bitmaps associated with a corresponding word identifications, and creates a plurality of hashed bitmaps.

9. A non-transitory computer-readable recording medium storing a search program that causes a computer to execute a process comprising:
restoring, when receiving an element formed by two or more characters and identification information on text data, each of a plurality of hashed axes related to the received element; and
searching for, based on presence information that is related to the element in each of a plurality of pieces of text data and that is indicated by each of bits in restored bit strings, the presence information on the element associated with the received identification information on the text data, wherein
each of the plurality of hashed axes is hashed by a respective hash function with a different prime base, and
each of the plurality of hashed axes is hashed by the respective hash function that is applied for each of bitmaps associated with a corresponding word identification, and that creates a plurality of bitmaps.

10. A search method comprising:
restoring, when receiving an element formed by two or more characters and identification information on text data, each of a plurality of hashed axes related to the received element, by a processor; and
searching for, based on presence information that is related to the element in each of a plurality of pieces of text data and that is indicated by each of bits in restored bit strings, the presence information on the element associated with the received identification information on the text data, by the processor, wherein
each of the plurality of hashed axes is hashed by a respective hash function with a different prime base, and
each of the plurality of hashed axes is hashed by the respective hash function that is applied for each of bitmaps associated with a corresponding word identification, and that creates a plurality of hashed bitmaps.

11. A search device comprising:
a processor that executes a process including:
restoring, when receiving an element formed by two or more characters and identification information on text data, each of a plurality of hashed axes related to the received element; and
searching, based on presence information that is related to the element in each of a plurality of pieces of text data and that is indicated by each of bits in bit strings restored at the restoring, the presence information on the element associated with the received identification information on the text data, wherein each of the plurality of hashed axes is hashed by a respective hash function with a different prime base, and each of the plurality of hashed axes is hashed by the respective hash function that is applied for each of bitmaps associated with a corresponding word identification, and that creates a plurality of hashed bitmaps.

\* \* \* \* \*